United States Patent [19]

Berstein

[11] Patent Number: 4,532,416
[45] Date of Patent: Jul. 30, 1985

[54] TRANSACTION TERMINAL WITH SIMPLIFIED DATA ENTRY

[76] Inventor: Patrick Berstein, 209 Willowbrook Rd., Thornhill, Ontario, Canada

[21] Appl. No.: 455,044

[22] Filed: Jan. 3, 1983

[51] Int. Cl.³ .............................................. G06F 15/30
[52] U.S. Cl. ........................................ 235/379; 235/380
[58] Field of Search ................................ 235/379, 380

[56] References Cited

U.S. PATENT DOCUMENTS

| | | | |
|---|---|---|---|
| 3,996,450 | 12/1976 | Kerkhoff | 235/61.7 |
| 4,125,871 | 11/1978 | Martin | 364/900 |
| 4,268,715 | 5/1981 | Atalla | 235/379 |
| 4,277,837 | 7/1981 | Stuckert | 235/379 |
| 4,300,042 | 11/1981 | Oldenkamp et al. | 235/449 |
| 4,317,957 | 3/1982 | Sendrow | 235/379 |
| 4,321,672 | 3/1982 | Braun | 235/379 |
| 4,355,369 | 10/1982 | Garvin | 235/379 |

FOREIGN PATENT DOCUMENTS 1019702  2/1966  United Kingdom .

Primary Examiner—Harold I. Pitts
Attorney, Agent, or Firm—Ridout & Maybee

[57] ABSTRACT

In a transaction terminal, a credit card reader is used not only to enter data from cards of customers, but a special card is used to place the terminal in supervisory modes in at least one of which it will accept data from further special cards which are used to input data used in the transaction mode, particularly alphanumeric data for printing on transaction slips. The terminal has a customer accessible auxiliary keyboard which may be used for data entry, at a location remote from the main unit, allowing for point of sale data entry, including private entry of a customer's Personal Identification Number, either to validate a transaction or during selection of a PIN for encryption by the terminal.

13 Claims, 5 Drawing Figures

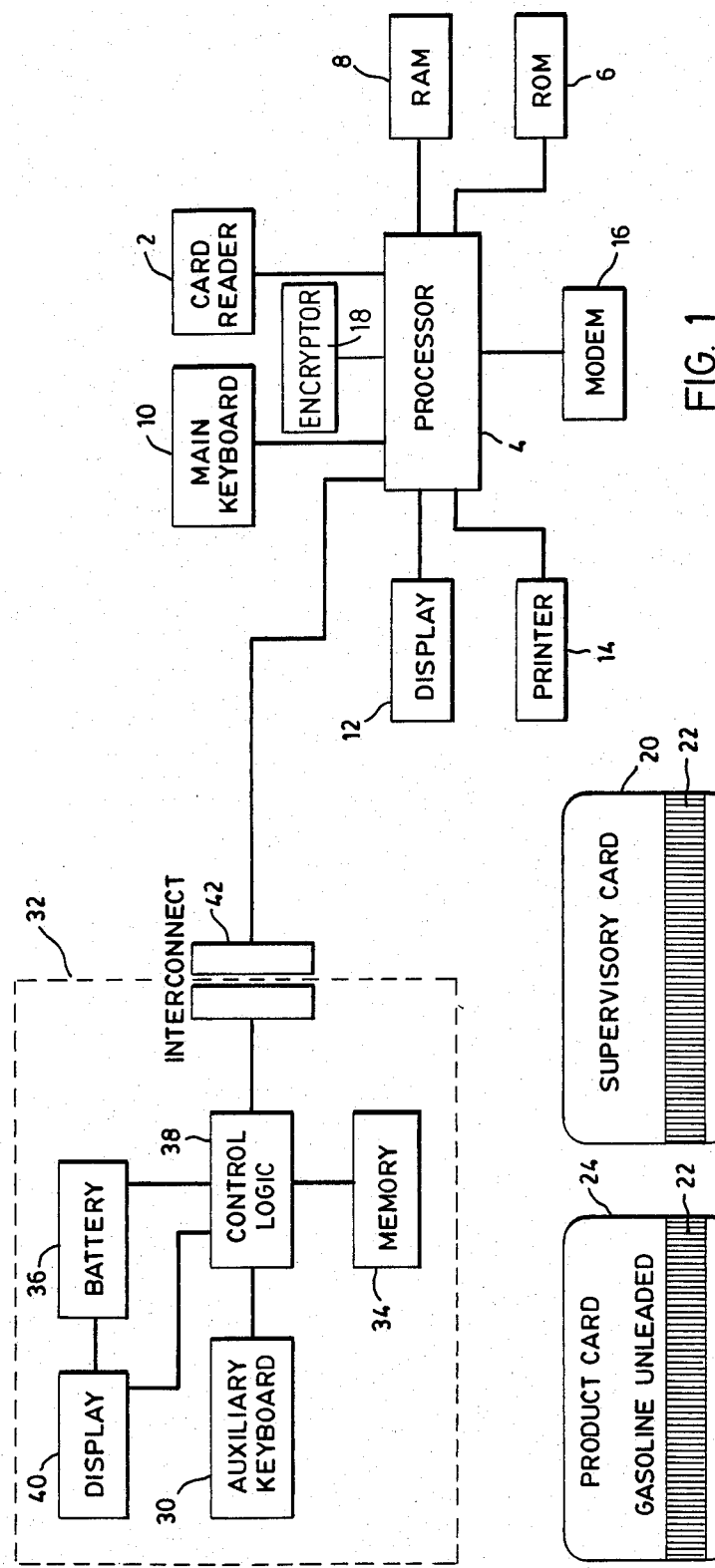

TRANSACTION TERMINAL WITH SIMPLIFIED DATA ENTRY

FIELD OF THE INVENTION

This invention relates to data entry terminals, and more especially point of sale or transaction data entry terminals capable of handling credit card transactions.

BACKGROUND OF THE INVENTION

Of recent years, there has been an increasing use of credit cards carrying machine readable coding identifying the cardholder's account and including further relevant information, including, in an encoded form, a Personal Identification Number, or PIN, known to the cardholder but not appearing on the card in human readable form. Entry by a cardholder of his PIN in a machine equipped to read the encoded information of the card may be used to confirm a transaction in place of the usual requirement of a signed authorization. Although various systems have been developed for storing the encoded information, the currently preferred system utilizes a magnetically striped card carrying two parallel tracks, the information in at least one track (Track 1) being in a standardized (ANSI) format. This in turn facilitates the use of standardized credit card readers. Standards have also been developed for communicating and encrypting data exchanged between data entry terminals and host computers.

Systems have also been developed which will accept data from more than one class of card.

In British Pat. No 1,019,702 (Jones), a point of sale terminal has a reader which reads both product data from product labelling, and customer data from credit cards, but both are accepted sequentially as part of a single transaction in a transaction mode.

U.S. Pat. No. 4,300,042 (Odenkamp et al) discloses apparatus for generating different types of card for use in a system. One type of card is a programming card for modifying data in a system, but there is no description of how such cards are actually used.

In the apparatus of U.S. Pat. No. 3,996,450, a reader will accept ordinary credit cards, and also a supervisory card which places the apparatus in a mode in which it can alter data in an ordinary credit card. The effect of the supervisory card is to change the manner in which the apparatus treats a credit card.

Proposals have also been made for portable data entry devices for manual entry of numerical and code data, which can then be conveyed to a fixed terminal for further processing. An example of such a device is disclosed in U.S. Pat. No. 4,125,871 (Martin).

SUMMARY OF THE INVENTION

The present invention seeks to provide simplified operation of a data entry terminal equipped with a credit card reader.

Although it will be specifically described with reference to a unit adapted to read ANSI standard encoded magnetic stripe cards, the operation of the invention is not dependent upon the technique utilized to store information on or in the card, provided that such information is machine readable and a suitable reader is incorporated in the unit.

The invention is premised upon the use of the credit card reader not only to enter data from a customer's card, but also upon the use of special cards to place the unit in a supervisory mode or modes, and further special cards to alter the programming of the unit when in an appropriate supervisory mode.

According to the invention, a data terminal comprises a reader to read data from any one of a plurality of suitably encoded cards, a keyboard, and a data processor receiving data and storing data from said reader and said keyboard, said data processor having an operating mode and at least one supervisory mode, and said cards being of at least three classes, each, being encoded with a different class of data recognizable to the processor, the processor being responsive to data on cards of a first class to enable it to enter said at least one supervisory mode, and being controlled jointly by data from the keyboard and data from cards of a second class in said operating mode, and being controlled jointly by data from the keyboard and data from a third class of cards in at least one supervisory mode.

For example, cards of the first, supervisory class may be used to determine whether the unit operates in the operating or transaction mode in which it accepts and records customer information from a card tendered by a customer, and transaction information from the keyboard, or a second programming mode in which it accepts product identification or other information from a programming card together with further data from the keyboard as to changes, such as price changes, which are to be entered in relation to that product or information. By utilizing three categories of cards in this manner, the extent and complication of the required keyboard entries is greatly reduced, permitting both simplified operation and a simplified keyboard since the data entered by keyboard may be numerical and functional and the need for alphabetic entries may be eliminated.

In order to facilitate confirmation of credit card transactions using a terminal equipped with a credit card reader, it is very desirable that facilities be provided for entry of a customer's PIN so as to enable transactions to be verified without obtaining the customer's signature on an imprinted sales slip. In an application of a terminal such as at a full service filling station, a conventional credit card transaction involves multiple trips of an attendant between the customer's vehicle and an office which may be some distance away, over a route which will be more or less exposed to the elements and may be crowded with vehicles and equipment. In order for use of the PIN to be really practicable, facilities must be provided for customer entry of the PIN under circumstances which enable the customer to enter the number in privacy.

According to a further feature of the invention, a transaction terminal comprises a transaction terminal comprising a reader to read data from suitably encoded credit cards, a main keyboard, a main display for displaying information including data entered through the keyboard, a printer, and a data processor receiving data from said reader and said at least one keyboard, wherein the terminal further includes a portable keyboard detachable from the remainder of the terminal and operable to receive data entries at points remote from the remainder of the terminal and transfer them to the processor independently of the main keyboard and display.

With this arrangement, the portable keyboard can be taken to the customer for PIN entry, without the entry appearing on the main display or the customer requiring access to the main terminal keyboard. Moreover, by making use of the facilities required in any case for encrypting a PIN entered by a customer, the issue of new credit cards can be facilitated. Thus the terminal can encrypt a number selected by the customer, and output the code in whatever manner suits the procedure adopted by the card issuer. This avoids the necessity of the customer either having to visit a central office to select a PIN, or to disclose the PIN to local staff, yet requires no additional hardware at the terminal.

Further features of the invention will become apparent from the following description of a preferred embodiment of the invention.

SHORT DESCRIPTION OF THE DRAWINGS

In the drawings:

FIG. 1 is a block schematic diagram of a terminal in accordance with the invention;

FIG. 2A illustrates a supervisory card that may be employed in conjunction with the terminal;

FIG. 2B illustrates a product card that may be employed in conjunction with the terminal, FIG. 2C illustrates a station identification card that may be employed, in conjunction with the terminal; and FIG. 2D illustrates a message card that may be employed in conjunction with the terminal.

DESCRIPTION OF THE PREFERRED EMBODIMENT

Referring to FIG. 1, the general arrangement shown is little different from known transaction data entry terminals incorporating a card reader 2. The card reader is typically an ANSI standard Track 1 manual swipe magnetic card reader, although it will be understood that the card reader will be selected to be appropriate to the type and encoding of the cards to be utilized. It may also incorporate means for updating the encoded information on the card. The construction and functioning of the card reader and its interfacing with a processor 4 form no part of the invention, provided that it is capable of recovering data from a card presented to the reader and transferring it to the processor, the latter having a memory including read only memory 6 and random access memory 8. The processor is provided with various conventional peripherals such as a data entry keyboard 10, a data display 12, a printer 14, and a modem 16 through which it can communicate with a host computer.

Other than from the host computer, and an optional auxiliary keyboard whose function is described further below, data can be entered into the processor only from the keyboard 10 and the card reader 2. The difference from known terminals is that certain types of keyboard entry are replaced by data entered by means of special categories of cards, other than the usual customer cards, cards of which special categories form an integral part of the system. These cards are similarly constructed to conventional customer cards, but will carry some visual identification so as to enable differentiation by an operator. Cards bearing examples of such identifications are shown in FIGS. 2A to 2D. These cards carry codes which can be read by the reader 2, and which replace keyboard data entries utilized in conventional terminals. The function and construction of the processor can be otherwise identical to that of a conventional reader equipped terminal, except for changes in the programming stored in the ROM 6 to enable the processor to accept the appropriate codes from the card reader rather than the keyboard, and to prompt card rather than keyboard entries where appropriate. Such changes are well within the scope of ordinary programming skills and since they will in any case be dependent upon the nature of the remainder of the programming of the processor they will not be described in detail.

The first of the cards to be considered is the supervisory card 20 shown in FIG. 2A. In a practical transaction terminal, various modes of operation are desirable in addition to the normal mode in which details of transactions are entered and stored and receipts or other transaction records printed. These modes are known generally as supervisory modes. Thus one such mode provides for carrying out reconciliation totals. Other modes provide for alteration of data stored in the memory 8 in the unit, other than by ordinary transactions. A supervisory card may be utilized to enter a code from its magnetic stripe 22 which conditions the unit to accept a further keyboard entry selecting a particular supervisory mode. A particular supervisory card may have a code permitting access to all supervisory modes, or only selected modes, or even only a single mode. Such supervisory modes may include a reconciliation mode as mentioned above, a test mode for verifying proper operation of the unit, and various data entry modes. In at least certain of those data entry modes, data entry is at least in part by means of further data entry cards of which exemplary cards 24, 26, 28 are shown in FIGS. 2B, 2C and 2D.

The product cards 24 are utilized when the unit is in a product entry mode. Thus the unit may be programmed to store data (identification, price, or unit price) concerning a number, for example 10, of different products. This data may be changed by using a supervisory card followed by a single digit keyboard entry to select the product entry mode and then keying in the product number, which will prompt the unit to show on the display a request for entry of a product card. This card will identify a product and will prompt the unit to display the product identification and other data appropriate to the product such as a unit price. This other data may then be cleared and replaced by keyboard entry so as to establish a new unit price. In some cases, no additional data is required by the machine, and the card is merely used to establish the product or category of product to which a particular product number relates and to enter the appropriate data from the card into the memory 8. The unit may be programmed so that making an entry without a product number will produce a prompt for a request to print out on printer 14 a list of the product data stored by the terminal under each product number, which list may be placed on the terminal or elsewhere for reference by the operator.

Further cards may be utilized in the supervisory modes whenever it is necessary to enter alphabetic or alphnumeric information which can conveniently be stored in the relatively permanent format of a coded card. Thus in a further supervisory mode entered by an appropriate keyboard entry after use of an appropriate supervisory card 20, the name, address and telephone number of an establishment such as a service station at which the terminal is located may be entered by inserting, upon display of the appropriate prompt, a station identification card 26, which carries the appropriate data together with a code identifying it as data to be printed at the head of every receipt or other message printed by the printer 14.

In effect, the data entry cards provide the text of alphanumeric messages to be displayed or printed by the terminal during use, and which need to be capable of local alteration.

Similarly, in yet a further supervisory mode selected by appropriate keyboard entry following use of a supervisory card 20, an end of-receipt message such as "Drive Carefully" (together with suitable code identifying it as such) may be entered using a message card 28. Use of such cards means that a local operator can program the terminal with appropriate alphabetic or alphanumeric data for inclusion in receipts and messages to be printed by the printer 14, quickly and without the terminal requiring an alphanumeric keyboard, since all necessary keyboard entries may be made using a numeric keyboard, with a minimal number of additional function keys. Basically, only "Clear" and "Enter" keys are required in addition to numeric keys, but it will usually be convenient to include extra function keys such as "Credit to Account", "Back Step" (to correct mistakes in entry), "Cash" (to indicate a cash transaction and thus enable data entries to be made without prior reading of a customer card), and "Total".

All of these functions as well as the numerals 0–9 may be accommodated on a 4×4 key matrix, which not only saves cost but may also be much smaller than an alphanumeric keyboard. Furthermore, it means that the keyboard may readily be duplicated to provide additional portable keyboard units which may be handed to a customer at a point of sale such as a service station fuel pump. In its simplest form such a portable keyboard 30 may be connected to the rest of the terminal by a flexible cable, but in a preferred arrangement a portable keyboard is provided which forms part of a unit 32 which is wholly separable from the terminal, and comprises the keyboard 30, which is similar to the keyboard 10 but may have less function keys, a memory 34 organized to store a sequence of numbers entered by successive key strokes, under the control of control logic 38, an optional display 40 to display the numbers entered during entry, again under control of the logic 38, and a battery 36 to power the unit. When the unit 32 is plugged into the terminal by means of an interconnect 42, the memory is read under control of the processor 4 and the stored sequence of numbers accepted in place of an entry from the keyboard 10. Means may be provided to recharge the battery 36 while the unit is plugged in. In order to avoid a reliability problem associated with physical contacts, the interconnect 42 may be established by inductive coupling.

The advantages of including such an auxiliary keyboard which can be taken to a customer are several, and may be illustrated by considering an application of the terminal in a full service filling station. Normally speaking, a conventional credit card transaction in such a station requires an attendant to take a customer's card, go to an office to fill out and imprint a sales slip, and carry out any necessary verification and authorization procedures and return to the vehicle with the sales slip to obtain the customer's signature. It is necessary to have available both a writing implement and something upon which to support the sales slip during signature, and copies of the sales slip must subsequently be returned to the office. A considerable amount of manipulation is required on the part of the attendant, which slows down operation particularly under bad weather conditions. When using an auxiliary keyboard unit 32, the attendant hands the unit to the customer who enter a PIN, and then takes both the unit and the customer's card to the office where the remainder of the terminal is located. The unit 32 is then again plugged into the terminal and downloads the data it contains (including in this case the PIN number), and the card is passed through the reader 2 as part of a normal transaction sequence. Assuming that the sequence proceeds normally, the terminal will print a transaction slip which is returned to the customer with the card to complete the transaction. Clearly, the amount of manipulation required by the attendant is greatly reduced, and neither attendant nor customer is required to write anything. If the customer comes to the office, a cable connected portable keyboard 30 may be handed to the customer for entry of the customer's PIN.

When the portable keyboard unit is wholly separable from the main terminal, then the terminal processor cannot prompt for entries in the normal way. In this case, data can be entered by entering codes denoting the type of data, followed by the data itself. When the data is downloaded from the keyboard unit memory 34 into the terminal memory 8, the codes associated with the data identify it so that it can be utilized by the terminal at an appropriate point in a data acquisition sequence in place of data entered through the main keyboard 10. An appropriate code entered by an operator before handing the unit to a customer for PIN entry not only identifies the entry as PIN but instructs the terminal not to display or print out the PIN. The control logic 38 of the unit is configured so that, at least in the case of a PIN entry, completion of the entry by striking an enter key removes the entry from the display 40 (if provided) and it is thereafter prevented from being displayed either on the display 40 or the display 12, or printed out on the printer 14. The unit may, if a display 40 is provided, also be utilized by the operator to enter and display a total amount of a billing to be authorized which can be shown to the customer before handing over the unit for entry of the PIN. On return of the unit to the remainder of the terminal, a check can be made that the total authorized agrees with that arrived at by the terminal itself, before the transaction sequence is completed and a transaction slip printed. The PIN is also encrypted by an encryptor 18, which may be implemented by a commercially available data encryption unit such as the Intel (Trade Mark) 8294. Such an encryption unit, when supplied with an appropriate encryption code and data to be encoded will encode the data according to the Federal Information Processing data encryption standard using the National Bureau of Standards encryption algorithm. The encrypted PIN is compared with the encrypted PIN read from the customer's card by the reader to confirm the transaction.

This capability of allowing a customer to enter a PIN with privacy, and the fact that the terminal already includes the encryptor 18, also facilitates inclusion of a further customer service, by which a customer applying for a credit card is enabled to select a PIN of the customer's choice. A supervisory card 20 is used, followed by a numerical keyboard entry through the keyboard 10 to place the terminal in an encryption mode in which an encryption program is enabled. When a customer's credit card application is approved, the customer is informed of the account number. The customer enters first the account number, and then keys in a selected four digit number on the appropriately enabled portable keyboard 30. In practice it will be convenient to have the customer key in the four digit number twice, to provide confirmation and to produce an eight digit number, and then press the enter key which clears the display 40 (if provided) and transfers the number to the memory 34. When the keyboard unit 32 is plugged into the main terminal and downloads the memorized number, the encryption program encrypts the number to provide a code which can be forwarded to a central office with other data from the terminal via the modem 16. If a cable connected keyboard unit 30 is used, then the customer must be asked to enter the PIN when the appropriate prompt appears on the display 12. It will be understood that the actual procedure used may be varied to suit circumstances and security requirements, the important feature being that the presence at one terminal of both an encryption unit and a keyboard, separate from but communicating with the main terminal, enables PIn number selection to be carried at the terminal in a secure manner.

A further advantage of the separable unit 32 is that it can be used for data acquisition whilst leaving the remainder of the terminal free for dealing with other transactions. Indeed, it is possible to equip each attendant with a unit 32 whilst having only a single terminal or at any rate only as many terminals as are required to handle the required transactions.

Supervisory cards 20 can also be utilized to place the terminal in other supervisory modes, selected by suitable keyboard entries after reading of a card 20. These modes can include a diagnostic mode in which the functions of the terminal can be tested by suitable keyboard entries. Other modes enable a calendar clock function provided by the processor 4 to be checked or reset so that the correct date and time is printed on receipts by the printer 14, enable entries to be made ensuring the application of local tax rates, enable entries to be made in respect of cash added or removed from a cash drawer other than in the course of a transaction, and enable entries to be made to set authorization limits for credit transactions so that an operator is notified of an authorization requirement where necessary. It should be understood that such facilities are already known in electronic cash registers and transaction terminals and that the programming and electronic components of the system as a whole can follow conventional lines, except for minor alterations to the programming to enable the terminal to accept certain data from the card reader in place of or alternatively to the keyboard. This permits use of a simplified keyboard, simplifies operation, and improves control of access to the supervisory function. The simplified keyboard also simplifies provision of a portable keyboard as already described, which in turn makes it more practical to confirm transactions by entry of a customer's PIN.

What I claim is:

1. A transaction terminal comprising a reader to read data from any one of a plurality of suitably encoded cards, a keyboard, and a data processor receiving data and storing data from said reader and said keyboard, said data processor having an operating mode and at least one supervisory mode, and said cards being of at least three classes, each being encoded with a different class of data recognizable to the processor, the processor being responsive to data on cards of a first class to enable it to enter said at least one supervisory mode, and being controlled jointly by data from the keyboard and data from cards of a second class in said operating mode, and being controlled jointly by data from the keyboard and data from a third class of cards in at least one supervisory mode.

2. A terminal according to claim 1, including at least one card of said first class and a plurality of cards of said third class.

3. A terminal according to claim 2, wherein the cards of said third class are encoded with data readable by said reader and such as to change the data stored by said processor such as to alter its operations in its operating mode.

4. A terminal according to claim 1, including at least one of an alphanumeric printer and an alphanumeric display, wherein the data encoded on cards of the third class comprises alphanumeric messages to be displayed or printed on at least one of said printer and display.

5. A terminal according to claim 4, wherein the keyboard is a numeric and functional keypad.

6. A terminal according to claim 5, including a second keyboard usable alternatively to the first keyboard.

7. A terminal according to claim 6, wherein the second keyboard forms part of a portable keyboard unit separable from the remainder of the terminal.

8. A terminal according to claim 7, wherein the portable keyboard unit further comprises a memory, a power supply, control logic operative to display keyboard entries on the display and store them in the memory, and an interface to transfer data from the memory to the remainder of the terminal when the keyboard unit is assembled to the remainder of the terminal.

9. A transaction terminal comprising a reader to read data from suitably encoded credit cards, a main keyboard, a main display for displaying information including data entered through the keyboard, a printer, a data processor receiving data from said reader and said at least one keyboard, and a program memory containing selectable programs for operating said terminal in a plurality of modes in at least one of which it receives data from said credit card reader, wherein the terminal further includes a portable keyboard detachable from the remainder of the terminal and operable when attached to receive a data entry required to enable said at least one mode, at a point remote from the remainder of the terminal and operable to transfer it to the processor independently of the main keyboard and display when reunited with the remainder of the terminal.

10. A terminal according to claim 9, wherein the portable keyboard unit comprises a memory, a power supply, control logic operative to store keyboard entries in the memory, and an interface to transfer data from the memory to the remainder of the terminal when the keyboard unit is assembled to the remainder of the terminal.

11. A terminal according to claim 9, including a plurality of portable keyboard units any one of which may be used to transfer data to the remainder of the terminal.

12. A terminal according to claim 10, including an encryptor, wherein the program memory includes a program for operating said terminal in a transaction mode in which it is configured as part of a transaction sequence to input a Personal Idenfication Number transferred to the processor from the portable keyboard unit to the encryptor, and to compare an encrypted code from the encryptor with an encrypted Personal Identification Number code received from the card reader, and to continue a transaction sequence if the codes coincide.

13. A terminal according to claim 12, wherein the program memory includes a program for operating said terminal in an encryption mode in which it is configured successively to receive a Personal Identification Number transferred to the processor from the portable keyboard unit, to input that number to the encryptor to form a code, and to output that code.

* * * * *